US00RE50279E

(19) United States
(12) Reissued Patent
Cho et al.

(10) Patent Number: US RE50,279 E
(45) Date of Reissued Patent: Jan. 21, 2025

(54) DISCOVERY METHOD AND APPARATUS

(71) Applicant: Samsung Electronics Co., Ltd., Suwon-si (KR)

(72) Inventors: Songyean Cho, Seoul (KR); Youngkyo Baek, Seoul (KR); Kyeongin Jeong, Yongin-si (KR); Youngbin Chang, Suwon-si (KR); Sangsoo Jeong, Suwon-si (KR)

(73) Assignee: Samsung Electronics Co., Ltd., Suwon-si (KR)

(21) Appl. No.: 16/705,108

(22) Filed: Dec. 5, 2019

Related U.S. Patent Documents

Reissue of:
(64) Patent No.: 9,839,059
Issued: Dec. 5, 2017
Appl. No.: 14/893,022
PCT Filed: May 20, 2014
PCT No.: PCT/KR2014/004505
§ 371 (c)(1),
(2) Date: Nov. 20, 2015
PCT Pub. No.: WO2014/189263
PCT Pub. Date: Nov. 27, 2014

(30) Foreign Application Priority Data

May 20, 2013 (KR) ..... 10-2013-0056713
Jul. 10, 2013 (KR) ..... 10-2013-0080875

(51) Int. Cl.
*H04W 72/04* (2023.01)
*H04L 67/51* (2022.01)
(Continued)

(52) U.S. Cl.
CPC ..... *H04W 72/04* (2013.01); *H04L 67/51* (2022.05); *H04W 48/16* (2013.01); *H04W 68/02* (2013.01);
(Continued)

(58) Field of Classification Search
CPC ..... H04L 67/16; H04W 8/005; H04W 48/16; H04W 72/04; H04W 72/0406; H04W 76/14
See application file for complete search history.

(56) References Cited

U.S. PATENT DOCUMENTS

2007/0141984 A1* 6/2007 Kuehnel ..... H04W 4/008 455/41.2
2007/0141986 A1* 6/2007 Kuehnel ..... H04W 48/16 455/41.2
(Continued)

FOREIGN PATENT DOCUMENTS

CN 101341685 A 1/2009
CN 101341686 A 1/2009
(Continued)

OTHER PUBLICATIONS

Supplementary European Search Report dated Dec. 20, 2016 in connection with European Patent Application No. 14 80 1686, 10 pages.
(Continued)

*Primary Examiner* — Matthew E Heneghan

(57) ABSTRACT

Provided are a discovery method and apparatus. A communication method for a user equipment (UE) may include: receiving first resource information indicating a first resource region and second resource information indicating a second resource region from an evolved Node B (eNB); receiving a first message from a second UE via the first resource region; checking whether the contents of the first message match the UE; and sending, when the contents of the first message match the UE, a second message associated with the first message to the second UE via the second resource region. A user equipment (UE) may include: a communication unit configured to receive first resource information indicating a first resource region and second
(Continued)

resource information indicating a second resource region from an evolved Node B (eNB), and receive a first message from a second UE via the first resource region; and a control unit configured to check whether the contents of the first message match the UE.

16 Claims, 14 Drawing Sheets

(51) Int. Cl.

| | |
|---|---|
| ***H04W 48/16*** | (2009.01) |
| ***H04W 68/02*** | (2009.01) |
| ***H04W 76/14*** | (2018.01) |
| *H04W 8/00* | (2009.01) |
| *H04W 72/20* | (2023.01) |
| *H04W 84/18* | (2009.01) |

(52) U.S. Cl.
CPC ..... *H04W 76/14* (2018.02); *H04W 8/005* (2013.01); *H04W 72/20* (2023.01); *H04W 84/18* (2013.01)

(56) References Cited

U.S. PATENT DOCUMENTS

| | | | | |
|---|---|---|---|---|
| 2009/0063686 | A1* | 3/2009 | Schmidt | H04L 12/2809 709/227 |
| 2009/0104875 | A1* | 4/2009 | Naniyat | H04W 76/02 455/41.3 |
| 2011/0106837 | A1* | 5/2011 | Walton | H04L 67/1068 707/769 |
| 2011/0258313 | A1 | 10/2011 | Mallik et al. | |
| 2012/0063335 | A1* | 3/2012 | Cho | H04W 52/0229 370/312 |
| 2012/0093052 | A1 | 4/2012 | Kang et al. | |
| 2013/0003708 | A1* | 1/2013 | Ko | H04W 4/18 455/436 |
| 2013/0109301 | A1 | 5/2013 | Hakola et al. | |
| 2013/0148642 | A1 | 6/2013 | Abraham et al. | |
| 2013/0223356 | A1* | 8/2013 | Khoshnevis | H04W 72/042 370/329 |
| 2014/0254429 | A1 | 9/2014 | Wang et al. | |

FOREIGN PATENT DOCUMENTS

| | | | |
|---|---|---|---|
| WO | 2009009379 | A1 | 1/2009 |
| WO | 2012174151 | A2 | 12/2012 |
| WO | 2013049959 | A1 | 4/2013 |
| WO | WO 2013/062310 | A1 | 5/2013 |

OTHER PUBLICATIONS

Office Action dated Feb. 24, 2018 in connection with Chinese Patent Application No. 201480029277.5, 14 pages.
Office Action dated Mar. 11, 2019 in connection with Chinese Patent Application No. 201480029277.5, 18 pages.
Decision of Patent dated Oct. 30, 2019 in connection with Korean Patent Application No. 10-2013-0080875, 8 pages.
Office Action dated Oct. 15, 2018 in connection with European Patent Application No. 14 801 686.8, 9 pages.
European Search Report dated Nov. 15, 2019 in connection with European Patent Application No. 19 19 5128, 11 pages.
European Search Report dated Apr. 8, 2022, in connection with European Application No. 21199410.8, 12 pages.
International Search Report dated Aug. 22, 2014 in connection with International Patent Application No. PCT/KR2014/004505, 7 pages.
Zte, "Solution for ProSe Discovery and Communication", SA WG2 Meeting #96, San Diego, California, Apr. 8-12, 2013, S2-130979, 9 pages.
Renesas Mobile Europe Ltd, "Solution for ProSe UE Discovery", SA WG2 Meeting #96, San Diego, California, Apr. 8-12, 2013, S2-131194, 11 pages.
Motorola Mobility, "ProSe Solution for Direct Discovery", 3GPP TSG SA WG2 Meeting #96, San Diego, California, Apr. 8-12, 2013, TD S2-131429, 3 pages.
3GPP TR 23.703 V0.3.0, "3rd Generation Partnership Project; Technical Specification Group Services and System Aspects; Study on Architecture Enhancements to Support Proximity Services (ProSe) (Release 12)", Apr. 2013, 26 pages.
Foreign Communication From a Related Counterpart Application, European Application No. 14801686.8-1854, Extended European Search Report dated Dec. 20, 2016, 10 pages.

* cited by examiner

DISCOVERY METHOD AND APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

The present application *is an application for reissue of U.S. Pat. No. 9,839,059 B2 issued on Dec. 5, 2017 on U.S. Non-Provisional patent application Ser. No. 14/893,022 filed Nov. 20, 2015, which* claims priority under 35 U.S.C. §365 to International Patent Application No. PCT/KR2014/004505 filed May 20, 2014, entitled "DISCOVERY METHOD AND APPARATUS", and, through International Patent Application No. PCT/KR2014/004505, to Korean Patent [Application] *Applications* Nos. 10-2013-0056713 filed May 20, 2013 and 10-2013-0080875 filed Jul. 10, 2013, each of which are incorporated herein by reference into the present disclosure as if fully set forth herein.

TECHNICAL FIELD

The present invention relates to a method and apparatus for discovery and, more particularly, to a discovery method and apparatus for device-to-device (D2D) communication.

BACKGROUND ART

FIG. 1 illustrates a network architecture for Proximity Services (ProSe). As shown in FIG. 1, ProSe refers to a service that supports a data transfer path enabling two user equipments (UEs) to directly exchange data without use of the infrastructure of a mobile communication network. In other words, ProSe enables proximate UEs to exchange data through a direct data path without help of the backhaul of a mobile communication network.

To implement a ProSe application utilizing a direct data path as shown in FIG. 1, it is necessary to discover a device to communicate and identify the need for communication with the device. For example, when a user wishes to take a proximate taxi for Seoul by use of a ProSe based taxi finding application, it is necessary to find or identify a device or UE running the taxi finding application with interest information "not taken by a passenger and can go to Seoul".

In addition, it is necessary for UEs being allowed to run specific applications to exchange messages.

DISCLOSURE OF INVENTION

Technical Problem

Accordingly, an aspect of the present invention is to provide a method and apparatus that enable efficient D2D discovery and allow user equipments running the identical applications to exchange messages.

Solution to Problem

In accordance with an aspect of the present invention, there is provided a method of communication for a user equipment (UE). The method may include: receiving first resource information indicating a first resource region and second resource information indicating a second resource region from an evolved Node B (eNB); receiving a first message from a second UE via the first resource region; checking whether the contents of the first message match the UE; and sending, when the contents of the first message match the UE, a second message associated with the first message to the second UE via the second resource region. In accordance with another aspect of the present invention, there is provided a user equipment (UE). The user equipment may include: a communication unit configured to receive first resource information indicating a first resource region and second resource information indicating a second resource region from an evolved Node B (eNB), and receive a first message from a second UE via the first resource region; and a control unit configured to check whether the contents of the first message match the UE. When the contents of the first message match the UE, the communication unit may send a second message associated with the first message to the second UE via the second resource region.

In accordance with another aspect of the present invention, there is provided a method of communication for a user equipment (UE). The method may include: receiving first resource information indicating a first resource region and second resource information indicating a second resource region from an evolved Node B (eNB); sending a first message via the first resource region; and receiving a second message associated with the first message from a second UE via the second resource region.

In accordance with another aspect of the present invention, there is provided a user equipment (UE). The user equipment may include a communication unit that is configured to receive first resource information indicating a first resource region and second resource information indicating a second resource region from an evolved Node B (eNB), send a first message via the first resource region, and receive a second message associated with the first message from a second UE via the second resource region.

In accordance with another aspect of the present invention, there is provided a base station (eNB). The base station may include: a control unit configured to generate first resource information indicating a first resource region used to transceive a first message containing contents for interest matching with user equipments, and generate second resource information indicating a second resource region used to transceive additional information associated with the first message; and a communication unit configured to send the first resource information and the second resource information.

In accordance with another aspect of the present invention, there is provided a method of communication for a base station (eNB). The method may include: generating first resource information indicating a first resource region used to transceive a first message containing contents for interest matching with user equipments, and generating second resource information indicating a second resource region used to transceive additional information associated with the first message; and sending the first resource information and the second resource information.

In accordance with another aspect of the present invention, there is provided a method of communication for a user equipment (UE). The method may include: sending, by the UE wishing to send a group message, a group ID to be sent to a resource usage indication region before group message transmission, and sending, when resource usage indication is successful, a group message to the group indicated by the group ID. The method may further include: monitoring, by the UE wishing to receive a group message, the resource usage indication region for group message transmission; checking whether the UE is a member of the group indicated by a group ID received from the resource usage indication region; receiving, when the UE is a member of the group, a group message region to which a message destined for the group is sent; and sending, when the UE is not a member of the group, the resource usage indication region only without monitoring or receiving the group message region to which a message destined for the group is sent so as to save power.

Advantageous Effects of Invention

In a feature of the present invention, a method and apparatus are provided that enable efficient D2D discovery and group communication.

MODE FOR THE INVENTION

Figure 1:
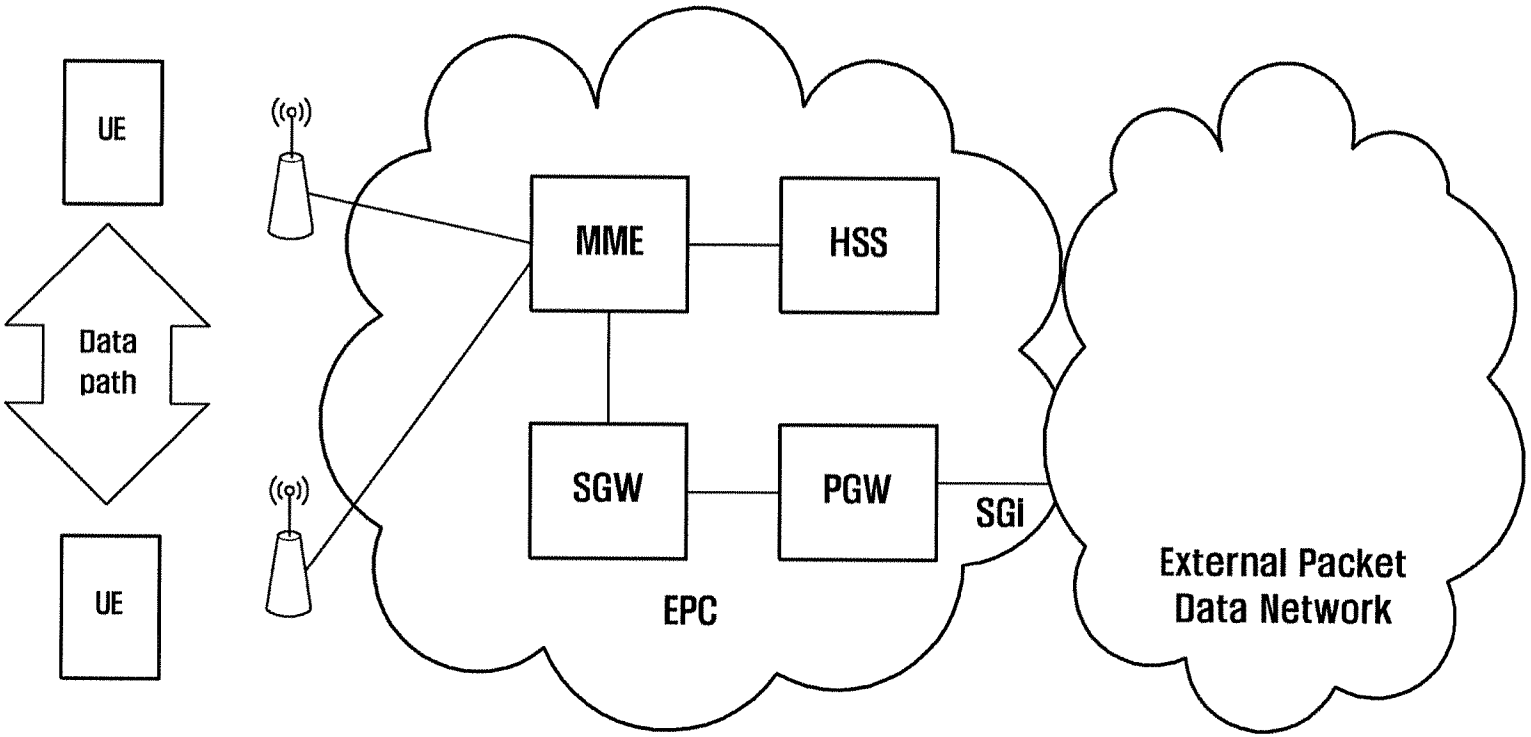
FIG. 1 illustrates a network architecture for Proximity Services (ProSe).

Hereinafter, embodiments of the present invention are described in detail with reference to the accompanying drawings.

Detailed descriptions of well-known functions and structures incorporated herein may be omitted to avoid obscuring the subject matter of the present invention. Descriptions of well-known constructions may also be omitted for clarity and conciseness.

In the drawings, some elements are exaggerated or only outlined in brief, and thus may be not drawn to scale. The same or similar reference symbols are used throughout the drawings to refer to the same or like parts.

Figure 2:
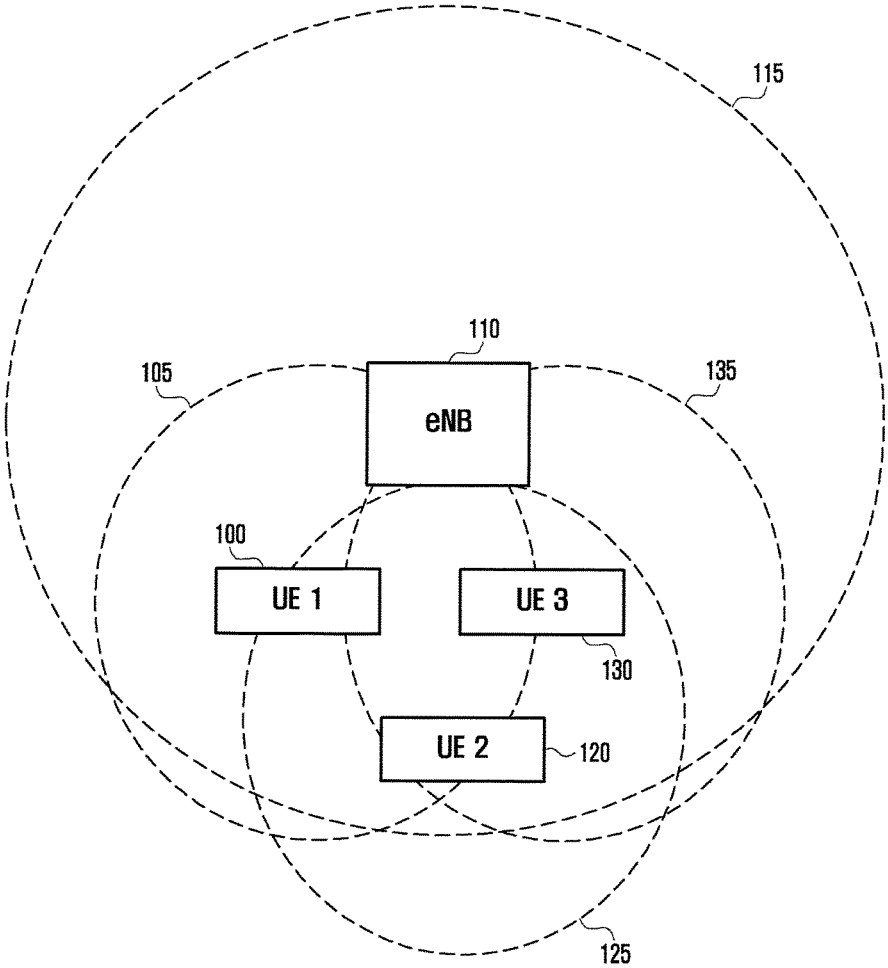
FIG. 2 depicts a network configuration of the communication system according to an embodiment of the present invention.

FIG. 2 depicts a network configuration of the communication system according to an embodiment of the present invention.

Referring to FIG. 2, in one embodiment, the communication system includes an eNodeB (eNB) 110 and user equipment 1 (UE 1) 100, UE 2 (120) and UE 3 (130). The eNodeB may be referred to as a base station. The user equipment (UE) may be referred to as a terminal. In FIG. 2, the coverages of the eNB 110, UE 1 (100), UE 2 (120) and UE 3 (130) are indicated by reference symbols 115, 105, 125 and 135, respectively.

In FIG. 2, it is assumed that UE 1 (100), UE 2 (120) and UE 3 (130) are placed at a short distance within the coverage of the eNB 110 so that a discover message sent by one of them may be received by each of the other ones.

Figure 3:
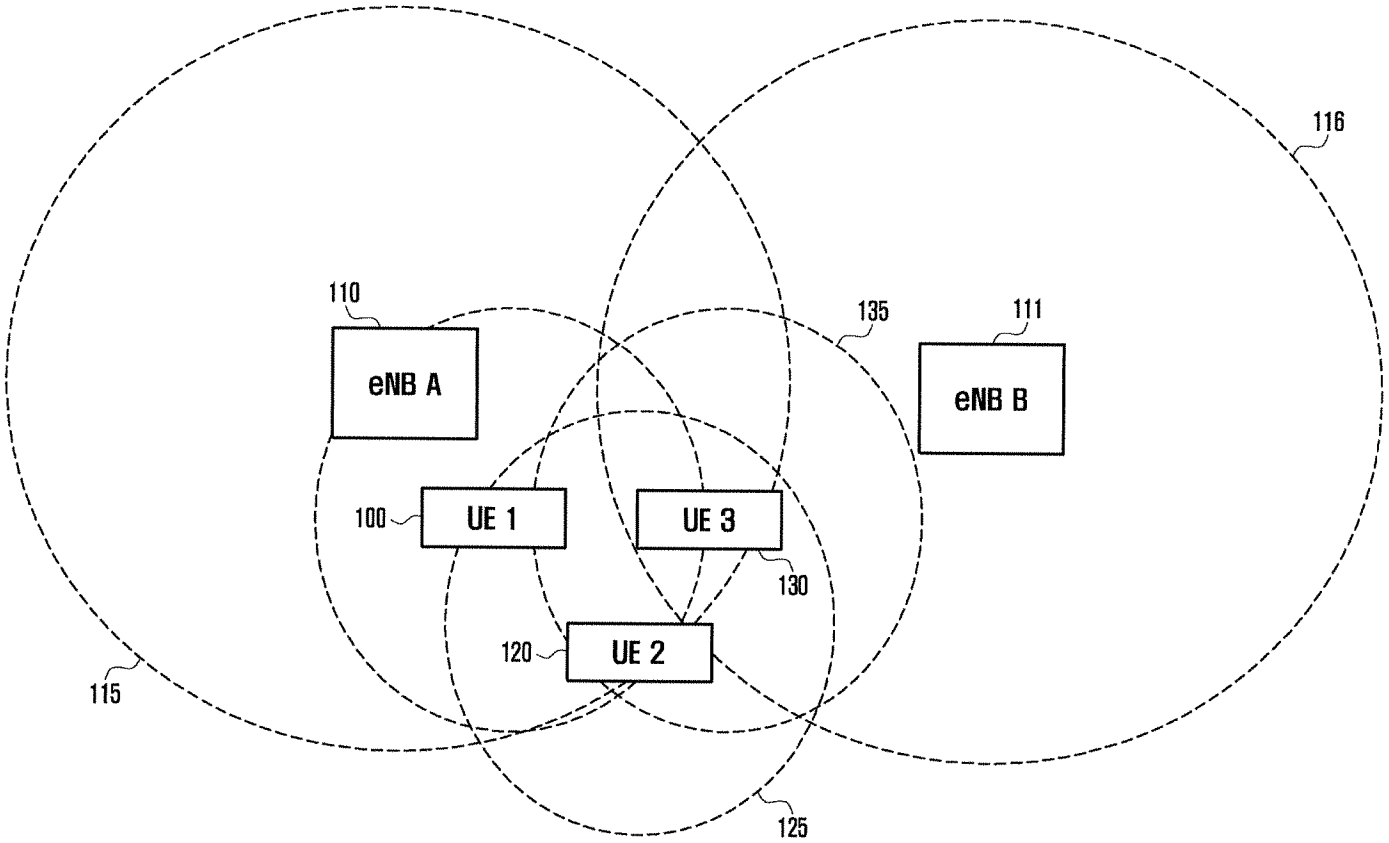
FIG. 3 depicts a network configuration of the communication system according to another embodiment of the present invention.

FIG. 3 depicts a network configuration of the communication system according to another embodiment of the present invention.

Referring to FIG. 3, in another embodiment, the communication system includes eNB A (110), eNB B (111), UE 1 (100), UE 2 (120) and UE 3 (130). The coverages of eNB A (110), eNB B (111), UE 1 (100), UE 2 (120) and UE 3 (130) are indicated by reference symbols 115, 116, 105, 125 and 135, respectively. FIG. 3 is similar to FIG. 2, but eNB B (111) is newly added.

In FIG. 3, UE 1 (100), UE 2 (120) and UE 3 (130) are all within the coverage 115 of eNB A (110). UE 3 (130) belongs also to the coverage 116 of eNB B (111). Here, although UE 3 (130) is assumed to belong to the coverage 115 of eNB A (110), the same procedure described later may be applied if UE 3 (130) does not belong to the coverage 115 of eNB A (110). It is assumed that UE 1 (100), UE 2 (120) and UE 3 (130) are placed at a short distance so that a discover message sent by one of them may be received by each of the other ones.

It is also assumed that when UEs (UE 1 (100), UE 2 (120), UE 3 (130)) belonging to the coverages 115 and 116 of different eNBs (eNB A (110), eNB B (111)) broadcast signals, the eNBs broadcast the same system information with respect to ProSe discovery.

In arrangement shown in FIG. 2 or FIG. 3, a UE wishing to be discovered may continuously send an announce message containing information on the UE. A receiving UE may receive the announce message for discovery, examine the sender information contained in the announce message, and send a communication request to the UE having sent the announce message if the sender information matches the receiver interest.

Here, the phrase "the sender information matches (corresponds to) the receiver interest" indicates that the information of the receiver or application of the receiver satisfies the condition contained in a message sent by the sender. This may also be represented by similar phrases such as "the sender interest matches the receiver interest", "the requirements of the received message correspond to the attribute or state information of the receiver", and "the received message matches the receiver". Matching or correspondence is determined on the basis of the condition described in a received message and state information of the receiver.

Meanwhile, the receiver may have to verify whether the announcement of the sender is true. In addition, when the interests match, the receiver may have to obtain additional information necessary for communication with the sender.

To this end, such additional information may have to be contained in the announce message sent by the sender.

However, when not only information needed to examine interest matching but also additional information is contained in the announce message, the size of the announce message increases. In addition, when the announce message is received by receivers without matching interests, the additional information except for the information needed to examine interest matching is useless for the receivers. That is, when the additional information is large in volume and the number of receiving UEs having matching interests is small, the possibility of wasting radio resources to transmit unused information becomes high.

Accordingly, the present invention discloses a discovery procedure in which a category 1 message is used to deliver the information needed to examine interest matching only and a category 2 message is used to deliver additional information needed for verification or communication establishment only when an interest match is found based on the category 1 message. Thereby, it is possible to reduce waste of radio resources due to reception of announce messages with a low interest matching probability.

According to one embodiment of the present invention, a category 1 message and a category 2 message may be separated according to the message size and type. The category 1 message is used to contain information needed to examine interest matching only and is smaller in size than the category 2 message. The category 2 message is used to deliver additional information needed for verification or communication establishment after an interest match is found and is larger in size than the category 1 message. Here, for the purpose of naming, differently named messages (e.g. type 1 message and type 2 message) may be utilized for the category 1 message and category 2 message.

Figure 4:
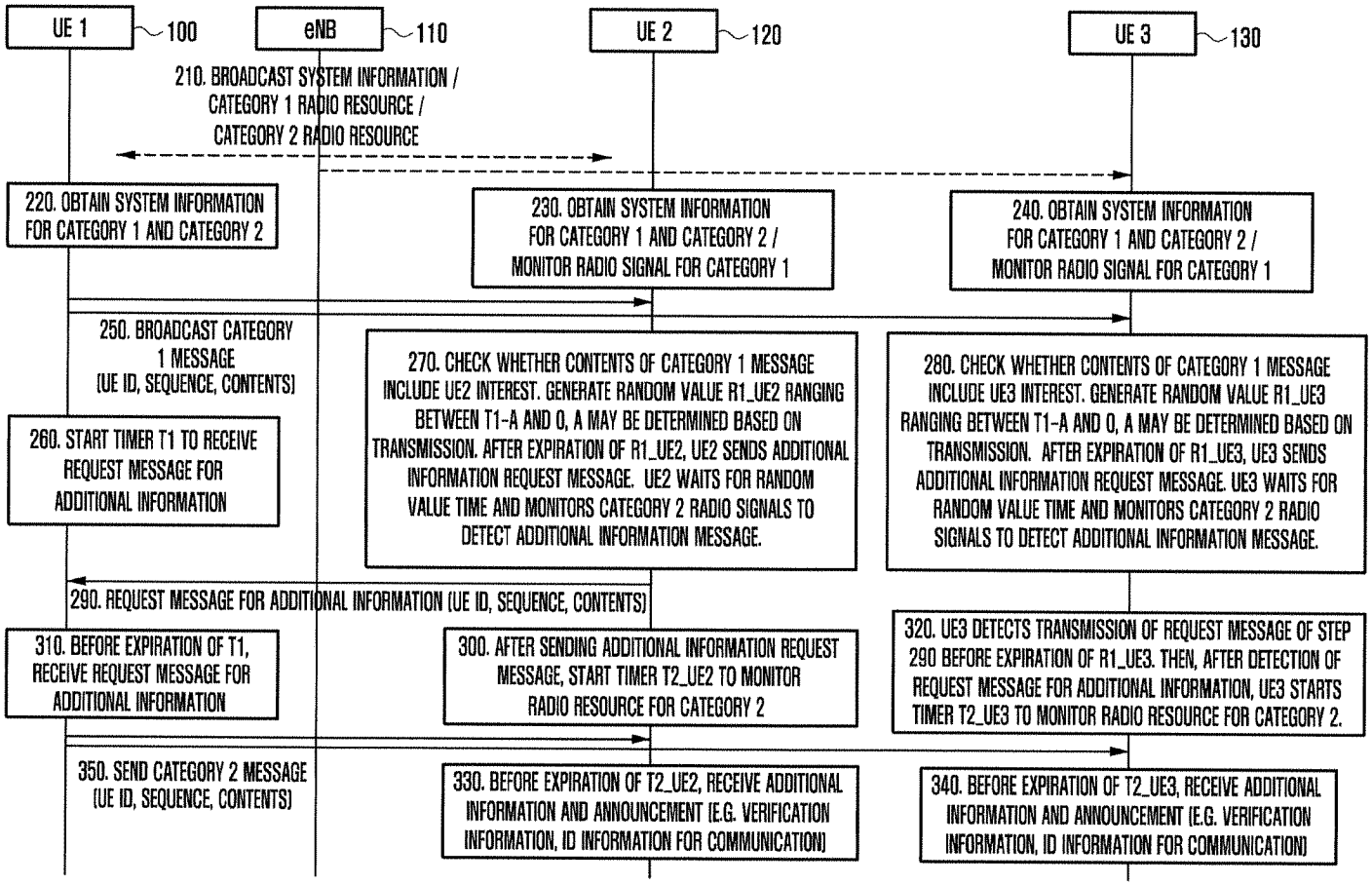
FIG. 4 is a sequence diagram of a procedure for message transmission according to a first embodiment of the present invention.

FIG. 4 is a sequence diagram of a procedure for message transmission according to a first embodiment of the present invention. The embodiment of FIG. 4 may be applied to various communication network configurations including ones shown in FIG. 2 or FIG. 3.

At step 210, the eNB 110 broadcasts system information regarding category 1 and category 2 messages. The system information may include radio resource information (e.g. radio resource locations) for the category 1 and category 2 messages. At step 220, UE 1 (100) receives the system information broadcast by the eNB 110. At step 230, UE 2 (120) receives the system information broadcast by the eNB 110. At step 240, UE 3 (130) receives the system information broadcast by the eNB 110. ProSe enabled UEs such as UE 1 (100), UE 2 (120), UE 3 (130) may receive system information broadcast by the eNB 110 and obtain information on radio resources used for transmitting a category 1 message and category 2 message.

Among the ProSe enabled UEs, UE 1 (100) identifies radio resource blocks to be used for category 1 message transmission on the basis of the radio resource information for a category 1 message received from the eNB 110. At step 250, UE 1 (100) broadcasts a category 1 message by use of one or more of the identified radio resource blocks. When a collision is detected after broadcasting, UE 1 (100) applies preset back-off first and then re-broadcasts the category 1 message via an unused radio resource block. This rebroadcasting may be repeated up to k times. If k attempts all fail, UE 1 (100) may wait for the duration corresponding to k times the back-off value and then attempt to broadcast.

Figure 5:
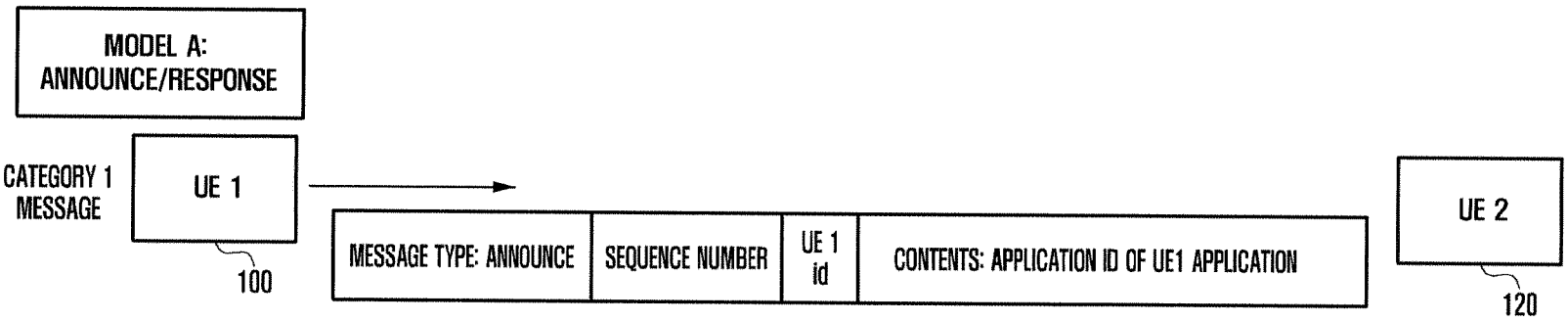
FIG. 5 illustrates the format of a category 1 message according to the first embodiment of the present invention.

FIG. 5 illustrates the format of a category 1 message according to the first embodiment of the present invention.

Referring to FIG. 5, the format of the category 1 message sent by UE 1 (100) at step 250 may include a UE ID field, sequence number field, and contents field. The message contents may contain, for example, the identifier of an application running on UE 1 (100) for message transmission. When two or more types of category 1 messages are defined, the format of the category 1 message may further include a type field to identify the category 1 message type. The UE ID field may be set to the identifier of UE 1 (100). The sequence number may be assigned according to the sequence of messages sent by the UE 1 (100). The UE ID field and the sequence number field are used to identify the message itself and may be replaced with a different identifier field for message identification.

After sending the category 1 message, at step 260, UE 1 (100) starts timer T1. Until expiration of timer T1, UE 1 (100) waits for an additional information request message sent by a UE having an interest matching the category 1 message.

To receive a category 1 message after step 230, UE 2 (120) monitors the radio resource assigned to category 1 message transmission. Similarly, to receive a category 1 message after step 240, UE 3 (130) monitors the radio resource assigned to category 1 message transmission. Upon reception of the category 1 message broadcast at step 250, at step 270 [at step 280], UE 2 (120) [UE 3 (130)] forwards the category 1 message to the corresponding ProSe application to check interest matching. Then, when an interest match is found, the ProSe application requests the communication unit of UE 2 (120) [UE 3 (130)] to send a category 2 message request message.

Further at step 270 [at step 280], UE 2 (120) [UE 3 (130)] generates a random value r1_UE2 [r1_UE3] ranging between T1-a and 0, and waits for the time duration corresponding to the random value r1_UE2 [r1_UE3] before sending the category 2 message request message. Thereafter, for the time duration corresponding to the random value r1_UE2 [r1_UE3], UE 2 (120) [UE 3 (130)] monitors reception of a category 2 message containing additional information for the category 1 message.

As UE 2 (120) and UE 3 (130) generate random values r1_UE2 and r1_UE3 respectively, waiting times may differ from each other. Here, it is assumed that the random value r1_UE2 is smaller than r1_UE3 (the waiting time of UE 2 (120) is shorter than that of UE 3 (130)). At step 290, UE 2 (120) sends an additional information request message. Although the additional information request message is destined for UE 1 (100), it may also be delivered to another UE (e.g. UE 3 (130)).

Figure 6:
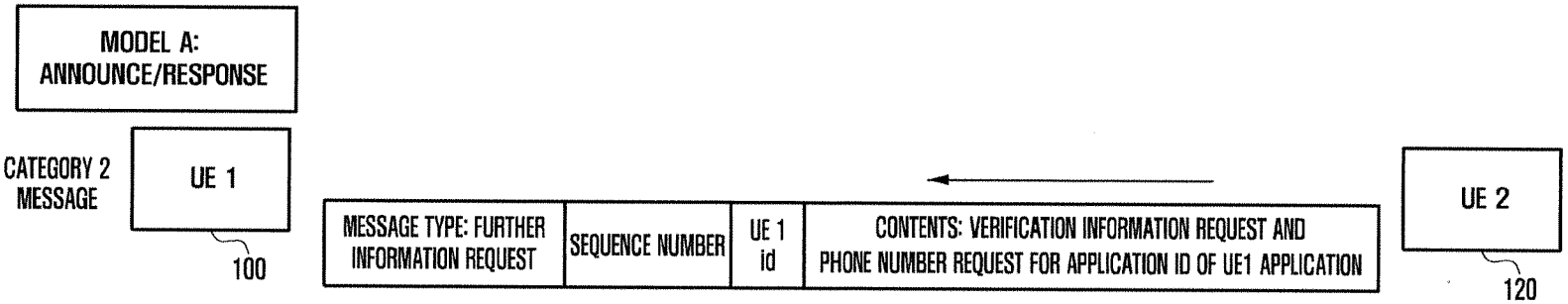
FIG. 6 illustrates the format of an additional information request message according to the first embodiment of the present invention.

FIG. 6 illustrates the format of an additional information request message according to the first embodiment of the present invention.

Referring to FIG. 6, the format of the additional information request message may include a message type field, UE ID field, sequence number field, and contents field. The message type field is used to identify whether the category 2 message is a request message, additional information message or other type message. For an additional information request message, the message type field may contain an indication indicating the additional information request message. The UE ID field and sequence number field may contain information indicating the preceding message associated with the additional information request message. For example, the additional information request message at step 290 may contain the UE ID (ID of UE 1) and sequence number contained in the category 1 message at step 250. In other words, an additional information request message contains information identifying the preceding message associated with additional information. The UE ID field and the sequence number field may be replaced with a different identifier field for message identification. The contents field may contain an indication indicating the requested additional information.

The request message at step 290 may be sent by use of category 2 message resources. Similarly to the category 1 message at step 250, a collision detection and retransmission procedure may be applied to the request message at step 290. The message contents may contain the request issued by the application running on UE 2 (120) having examined interest matching. For example, the message contents may contain a request for information needed to verify the application ID of UE 1 (100) and/or to perform communication establishment.

After sending the additional information request message, at step 300, UE 2 (120) starts timer T2-UE2.

Meanwhile, upon interest matching after reception of the category 1 message, UE 3 (130) waits for expiration of time r1_UE3 before sending an additional information request message. Before expiration of r1_UE3, UE 3 (130) may detect reception of the additional information request message sent by another UE (i.e. UE 2 (120)). Upon reception of the additional information request message, UE 3 (130) examines the contents thereof to check whether the contents contain all information to be requested by UE 3 (130). If the contents contain all information to be requested, UE 3 (130) does not issue an additional information request message.

For example, the communication unit of UE 3 (130) may detect an additional information request message destined for UE 1 (100) and containing the UE 1 sequence number and forward the message to the corresponding application having requested additional information. The corresponding application may examine the contents of the forwarded message and notify the communication unit or control unit that there is no need to send an additional information request message. Accordingly, at step 320, UE 3 (130) starts timer T2_UE3 without sending an additional information request message. Until expiration of timer T2_UE3, UE 3 (130) continues to monitor reception of a category 2 message.

The procedure for requesting additional information may be summarized as follows.

A receiving UE having received a category 1 message from a sending UE starts a timer set to a random value (waiting time) if an interest match is found. When an additional information request message associated with the category 1 message is not received from another receiving UE before expiration of the timer, the receiving UE sends an additional information request message upon expiration of the timer. When an additional information request message associated with the category 1 message is received from another receiving UE before expiration of the timer, if the receiving UE needs further information in addition to the information contained in the received additional information request message, the receiving UE sends an additional information request message upon expiration of the timer. When an additional information request message associated with the category 1 message is received from another receiving UE before expiration of the timer, if the receiving UE does not need further information in addition to the information contained in the received additional information request message, the receiving UE waits for reception of an additional information message without sending an additional information request message. When multiple additional information request messages are received before expiration of the timer, the receiving UE sends an additional information request message upon expiration of the timer only if the receiving UE needs further information in addition to the information contained in the multiple received additional information request messages.

At step 310, UE 1 (100) receives the additional information request message sent at step 290 before expiration of timer T1. At step 350, UE 1 (100) sends a category 2 message containing requested additional information as a response to the additional information request message. For example, in UE 1 (100), the contents of the additional information request message may be forwarded to the application having triggered the category 1 message and the application may provide an answer to the requirements indicated by the message contents. The category 2 message at step 350 contains information answering the requirements.

Figure 7:
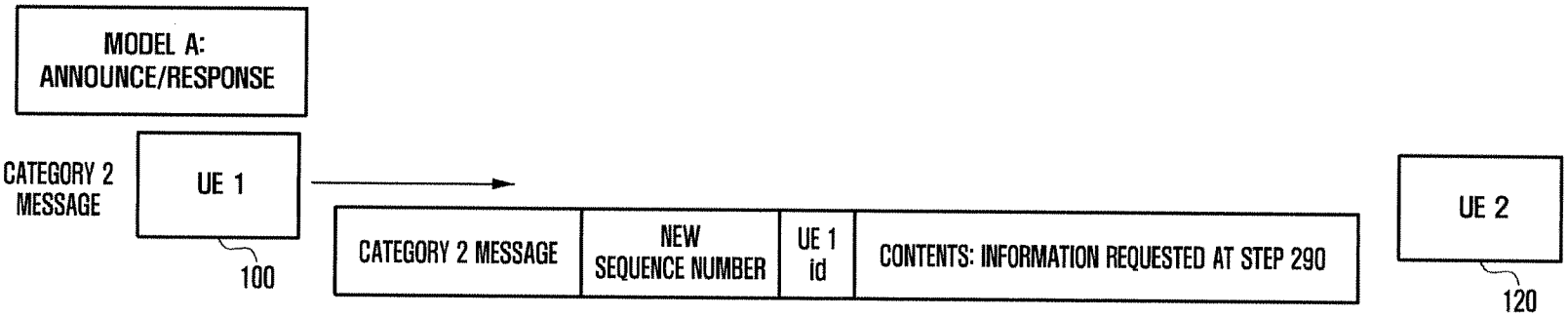
FIG. 7 illustrates the format of an additional information message according to the first embodiment of the present invention.

FIG. 7 illustrates the format of an additional information message according to the first embodiment of the present invention.

Referring to FIG. 7, the format of the additional information message may include a message type field, sequence number field, UE ID field, and contents field. The additional information message is a category 2 message. The message type field may be set to an indication indicating a message containing additional information. The sequence number field may be set to a sequence number different from that of the message used at step 250 or step 290. The UE ID field may be set to the identifier of a UE (UE 1) sending the additional information message. The UE ID field and sequence number field are used to identify the message itself and may be replaced with a different identifier field for message identification. The contents field may contain additional information requested by the message used at step 290. For example, if the message used at step 290 is a message requesting verification information, the contents field may contain verification information. If the message used at step 290 is a message requesting a sender phone number, the contents field may contain a phone number.

The category 2 message sent at step 350 reaches UE 2 (120) and UE 3 (130) monitoring the category 2 message radio resource. At step 330, UE 2 (120) examines whether the additional information message is sent by UE 1 (100), and forwards the contents of the additional information message to the application having requested additional information if the additional information message is a desired one. The application on UE 2 (120) obtains desired additional information from the message contents. At step 340, UE 3 (130) performs actions similar to those of UE 2 (120) at step 330 and the corresponding application on UE 3 (130) obtains desired additional information. When only a portion of the contents in the additional information message is needed, UE 3 (130) may obtain the needed portion only and discard the remaining portion of the contents.

According to the embodiment described in FIGS. 4 to 7, it is possible to utilize radio resources in an efficient manner by blocking unnecessary transmission and reception of additional information.

A flow of announce/additional information request/announce is used in the embodiment described in FIGS. 4 to 7. Discovery is performed in a flow of discover/announce in the following embodiment described in FIGS. 8 to 10.

Figure 8:
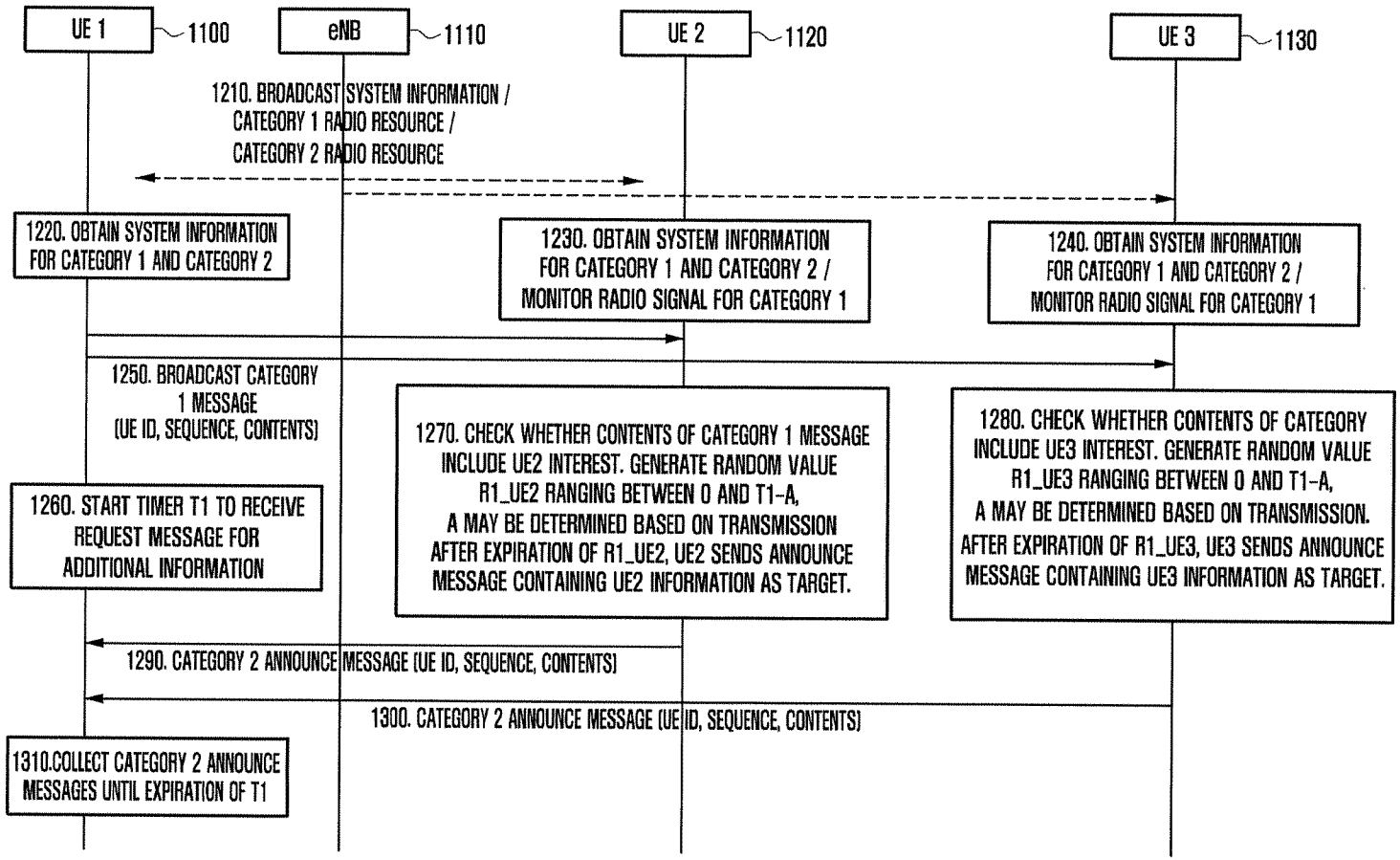
FIG. 8 is a sequence diagram of a procedure for message transmission according to a second embodiment of the present invention.

FIG. 8 is a sequence diagram of a procedure for message transmission according to a second embodiment of the present invention.

When discovery is performed in the form of discover/announce in communication network configurations shown in FIG. 2 or FIG. 3, as shown in FIG. 8, a UE wishing to perform discovery sends a category 1 discover message, and a receiving UE having received the discover message performs interest matching by checking whether the target information in the contents of the discover message matches the receiving UE and sends a category 2 message if an interest match is found.

The embodiment of FIG. 8 may be applied to various communication network configurations including ones shown in FIG. 2 or FIG. 3. The eNB 1110, UE 1 (1100), UE 2 (1120) and UE 3 (1130) correspond respectively to the eNB 110, UE 1 (100), UE 2 (120) and UE 3 (130) in FIG. 4. As the embodiments shown in FIG. 4 and FIG. 8 are similar in overall structure but are different in specific operation, different reference symbols are used.

At step 1210, the eNB 1110 broadcasts system information regarding category 1 and category 2 messages. The system information may include radio resource information (e.g. radio resource locations) for the category 1 and category 2 messages. At step 1220, UE 1 (1100) receives the system information broadcast by the eNB 1110. At step 1230, UE 2 (1120) receives the system information broadcast by the eNB 1110. At step 1240, UE 3 (1130) receives the system information broadcast by the eNB 1110. As steps 1210 to 1240 are identical respectively to steps 210 to 240 of FIG. 4, a description thereof is omitted.

In FIG. 8, ProSe enabled UEs such as UE 1 (1100), UE 2 (1120), UE 3 (1130) may receive system information broadcast by the eNB 1110 and obtain information on radio resources used for transmitting a category 1 message and category 2 message.

Among the ProSe enabled UEs, UE 1 (1100) wishing to send a category 1 message identifies radio resource blocks to be used for category 1 message transmission on the basis of the category 1 message radio resource information received from the eNB 1110. At step 1250, UE 1 (1100) broadcasts a category 1 message by use of one or more of the identified radio resource blocks. Collision detection and retransmission may be performed in a manner described in relation to step 250 of FIG. 4.

Figure 9:
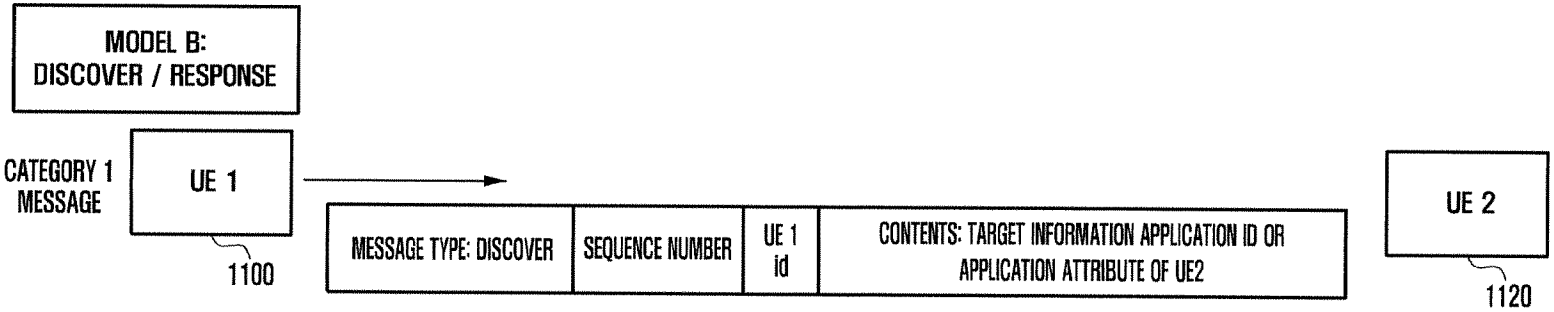
FIG. 9 illustrates the format of a discover message according to the second embodiment of the present invention.

FIG. 9 illustrates the format of a discover message according to the second embodiment of the present invention.

The discover message sent at step 1250 is a category 1 message. Referring to FIG. 9, the format of a discover message may include a message type field, sequence number field, UE ID field, and contents field. The message type field may contain an indication indicating a discover message. The UE ID field may be set to the identifier of a UE (UE 1) sending the message. Sequence numbers may be assigned in sequence according to the messages sent by UE 1 (1100). The contents field may contain information on a target to be discovered. For example, the contents field may contain an identifier of an application to be discovered or attribute information of an application running on a UE to be discovered (e.g. UE 2 (1120)).

After sending the category 1 message, at step 1260, UE 1 (1100) starts timer T1. Until expiration of timer T1, UE 1 (1100) waits for an additional information request message sent by a UE having an interest matching the category 1 message sent at step 1250.

The category 1 message sent at step 1250 is delivered to UE 2 (1120) and UE 3 (1130). Upon reception of the category 1 message, at step 1270 [at step 1280], UE 2 (1120) [UE 3 (1130)] forwards the contents of the category 1 message to the corresponding ProSe application to check interest matching. Then, when an interest match is found (discover message contents match the interest of UE 2 [UE 3] or application interest), the ProSe application generates contents including target information on UE 2 (1120) [UE 3 (1130)] and requests the communication unit of UE 2 (1120) [UE 3 (1130)] to send the generated contents in the form of announcement. At step 1290 [at step 1300], UE 2 (1120) [UE 3 (1130)] sends a category 2 message containing the generated contents.

Figure 10:
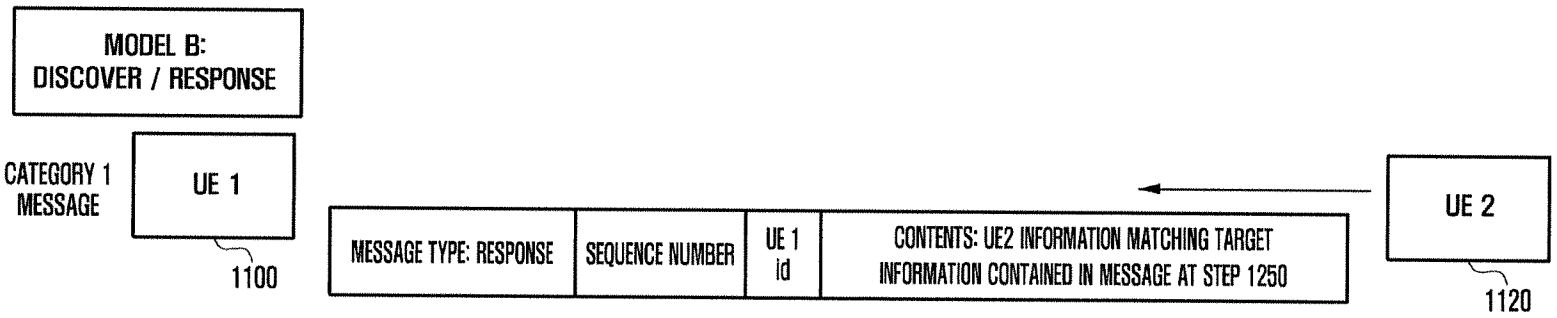
FIG. 10 illustrates the format of a response message according to the second embodiment of the present invention.

FIG. 10 illustrates the format of a response message according to the second embodiment of the present invention. Referring to FIG. 10, the format of a response message may include a message type field, sequence number field, UE ID field, and contents field. The message sent at step 1290 is a category 2 message. The message type field may be set to an indication indicating a response message. The sequence number field may be set to the sequence number of the discover message received at step 1250. The UE ID field may be set to the UE ID of the discover message received at step 1250. The contents field may contain target information generated by a corresponding application.

At step 1310, UE 1 (1100) collects announce messages of category 2 until expiration of timer T1. When a category 2 announce message (sent at step 1290 or step 1300) is received, if the UE ID of the received message is identical to the ID of UE 1 (1100) and the sequence number thereof is identical to that of the discover message sent at step 1250, UE 1 (1100) forwards the contents of the received message to the application having triggered the discover message at step 1250, enabling the application to receive a response for discovery.

In the embodiments described in FIGS. 4 to 10, applications are depicted as generating message contents. However, message contents may also be generated by the control units or operating systems of UEs.

Figure 11:
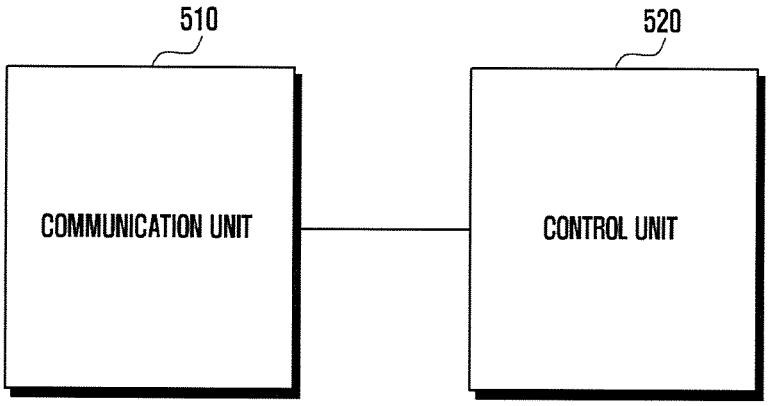
FIG. 11 is a block diagram of a user equipment (UE) according to an embodiment of the present invention.

FIG. 11 is a block diagram of a user equipment (UE) according to an embodiment of the present invention.

Referring to FIG. 11, the UE may include a communication unit 510 and a control unit 520.

The communication unit 510 sends and receives radio signals to perform communication in accordance with one or more of the embodiments described above. For example, the communication unit 510 may receive system information broadcast by the eNB. The communication unit 510 may send and receive one or more of the messages described in relation to FIGS. 5 to 7 or FIGS. 9 and 10. The control unit 520 controls components of the UE so as to perform an operation in accordance with one or more of the embodiments described above. For example, the control unit 520 may control a process of analyzing a message received through the communication unit 510, generating a message to be sent accordingly, and sending the generated message through the communication unit 510.

Figure 12:
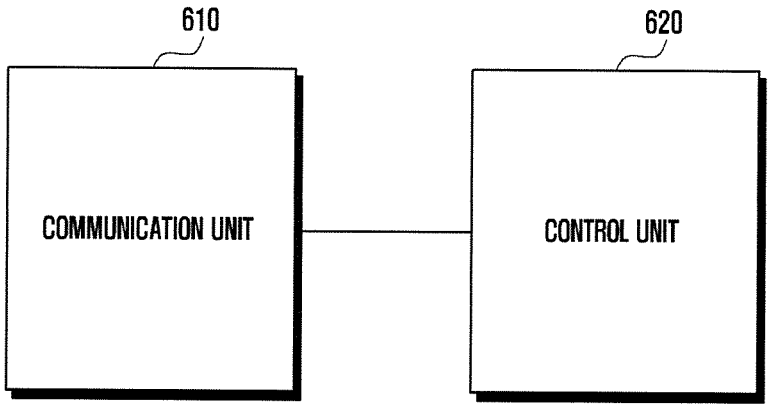
FIG. 12 is a block diagram of a base station (eNB) according to an embodiment of the present invention.

FIG. 12 is a block diagram of a base station (eNB) according to an embodiment of the present invention.

Referring to FIG. 12, the eNB may include a communication unit 610 and a control unit 620. The control unit 620 may generate resource information for category 1 and category 2 messages and generate system information. The control unit 620 may control the communication unit 610 to send the resource information and the system information.

Figure 13:
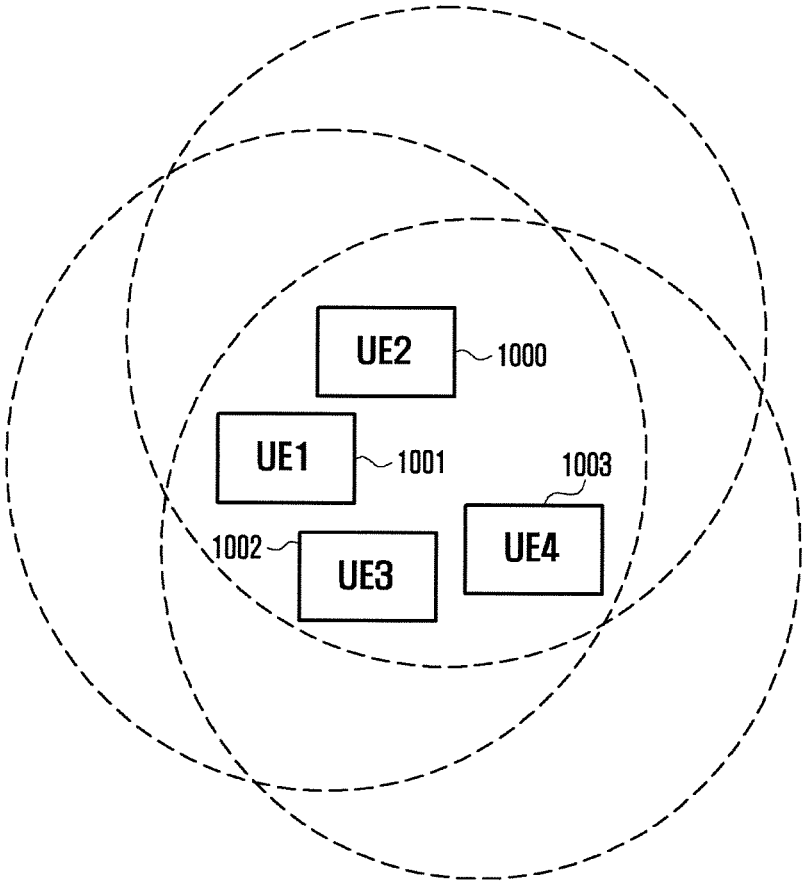
FIG. 13 depicts a network configuration of the communication system according to a third embodiment of the present invention.

FIG. 13 depicts a network configuration of the communication system according to a third embodiment of the present invention.

In FIG. 13, UE 1 (1000), UE 2 (1001), UE 3 (1002) and UE 4 (1003) are UEs capable of group communication, and communication ranges thereof overlap with each other. UE 1 (1000), UE 2 (1001), UE 3 (1002) and UE 4 (1003) belong to the same group, have the same group ID, and share a channel for group communication. To send and receive a group message through the shared channel, UE 1 (1000), UE 2 (1001), UE 3 (1002) and UE 4 (1003) belonging to the same group perform synchronization by use of pulse-coupled oscillators.

Figure 14:
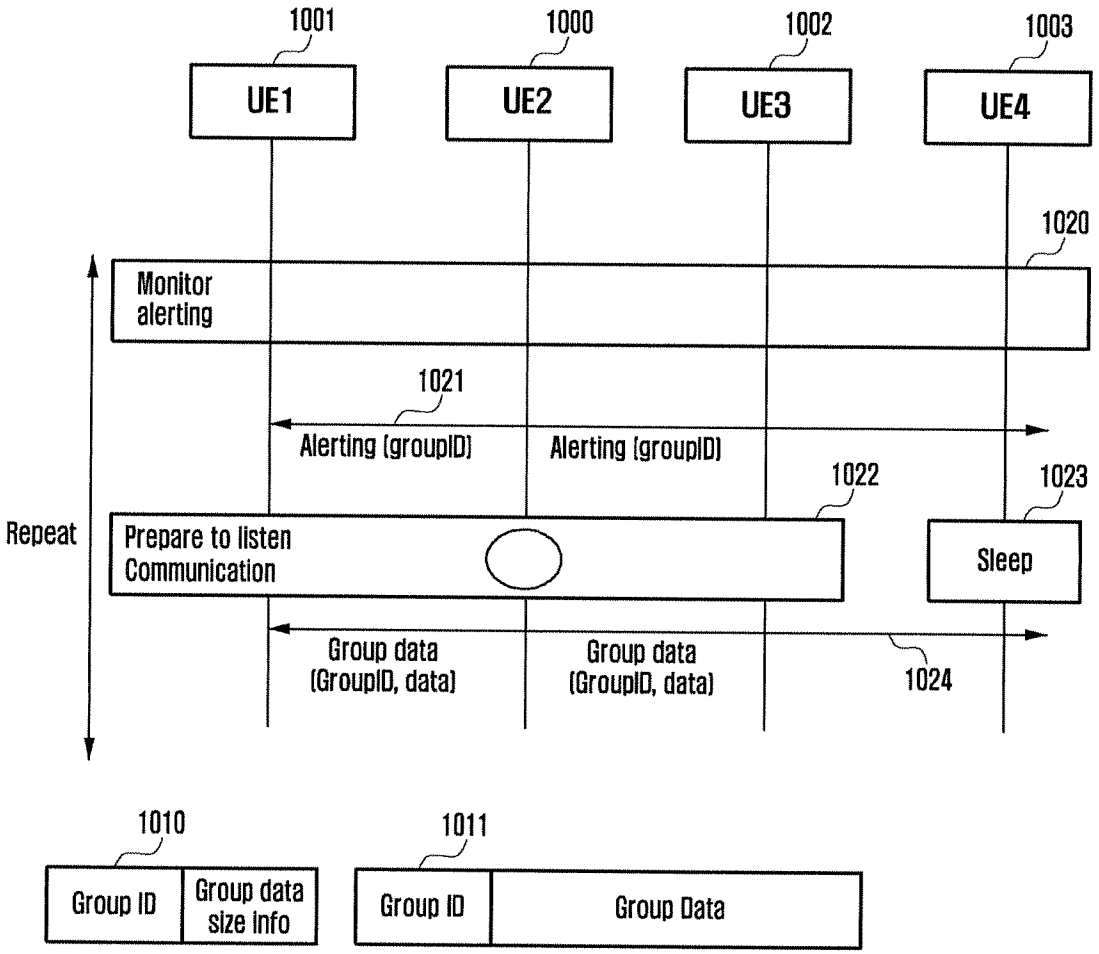
FIG. 14 illustrates procedures and message formats usable for the third embodiment of the present invention.

FIG. 14 illustrates procedures and message formats usable for the third embodiment of the present invention.

Referring to FIG. 14, to send group data after synchronization, UE 1 (1000) generates a random value ranging between 0 and t1 and waits for the time corresponding to the random value. After expiration of the waiting time, in a state wherein message transmission is allowed, UE 1 (1000) sends an alert message 1010 containing a group ID for the target group and message size information (step 1021). The message size information in the alert message indicates the size or transmission time of a group message to be sent later, and may be omitted when the size of the group message is fixed for all UEs. After time t2 from successful transmission of the alert message, UE 1 (1000) sends a group message 1011 (step 1024). The group message 1011 may contain a group ID and group data. To send group data after synchronization using a pulse-coupled oscillator, UE 2 (1001) generates a random value ranging between 0 and t1 and waits for the time corresponding to the random value. After expiration of the waiting time, in a state wherein message transmission is not allowed because the group communication channel is already used, UE 2 (1001) monitors the group communication channel (step 1020). Except for UE 1 (1000) sending a group message, UE 2 (1001), UE 3 (1002) and UE 4 (1003) monitor the group communication channel to receive the group message (step 1020). Upon reception of the alert message 1010 having a group ID and message size information (step 1021), each of UE 2 (1001), UE 3 (1002) and UE 4 (1003) checks whether it is a member of the group indicated by the group ID in the alert message. UE 2 (1001) being a member of the indicated group waits for reception of a group message containing a group ID (step 1022) and receives the group message sent by UE 1 (1000). After reception of the group message, UE 2 (1001) having a group message to be sent generates a random value ranging between 0 and t1 and waits for the time corresponding to the random value (waiting for sending an alert message). UE 3 (1002) not having a group message to be sent starts monitoring to receive an alert message (step 1020). Upon reception of the alert message, UE 4 (1003) being a non-member of the indicated group does not monitor the group communication channel for the group message transmission time by use of the message size information contained in the alert message (step 1023). Upon expiration of the group message transmission time, UE 4 (1003) starts monitoring to receive an alert message (step 1020).

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

In one embodiment of the present invention, the discovery apparatus may be a portable electronic device such as a mobile terminal, personal digital assistant (PDA), navigation aid, digital broadcast receiver, or portable multimedia player (PMP).

Hereinabove, various embodiments of the present invention have been shown and described for the purpose of illustration without limiting the subject matter of the present invention. The description of the various embodiments is to be construed as exemplary only and does not describe every possible instance of the invention. It should be understood by those skilled in the art that many variations and modifications of the method and apparatus described herein will still fall within the spirit and scope of the present invention as defined in the appended claims and their equivalents.

INDUSTRIAL APPLICABILITY

Meanwhile, embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method [of communication] *performed* by a *first* terminal *in a wireless communication system*, the method comprising:

*receiving, from a base station, radio resource information for receiving an alert message;* receiving [a discovery request], *from a second terminal, the alert* message *based on the radio resource information, the alert message* including [first] *a group identifier (ID) for a target group and* information [from another terminal] *indicating a time associated with a group message transmission*;

identifying whether *the first terminal is a member of the target group indicated by* the [first information] *group ID* in the [discovery request] *alert* message[is a same as second information configured with the terminal]; and

[transmitting]*receiving*, [if] *in response to identifying that* the first [information is same with the second information] *terminal is a member of the target group*, a [discovery response] *group* message [including information corresponding to the first information to the another] *from the second* terminal.

2. The method of claim 1, wherein, *in response to identifying that* the [discovery request message further includes user identification information of the another] *first* terminal *is not a member of the target group, the first terminal does not monitor the group message*.

[3. The method of claim 1, further comprising:

receiving resource information for the discovery request message and the discovery response message from a base station.]

4. A *first* terminal, comprising:

a transceiver; and at least one processor configured to[control the transceiver to]:

*control the transceiver to receive, from a base station, radio resource information for receiving an alert message,*

*control the transceiver to*receive [a discovery request], *from a second terminal, the alert* message *based on the radio resource information, the alert message* including [first] *a group identifier (ID) for a target group and* information [from another terminal] *indicating a time associated with a group message transmission*, identify whether *the first terminal is a member of the target group indicated by* the [first information] *group ID* in the [discovery request] *alert* message[is a same as second information configured with the terminal], and

[transmit]*control the transceiver to receive*, [if] *in response to identifying that* the first [information] *terminal* is [the same as the second information] *a member of the target group*, a [discovery response] *group* message [including information corresponding to the first information to] *from* the [another] *second* terminal.

5. The terminal of claim 4, wherein, *in response to identifying that* the [discovery request message further includes user identification information] *first terminal is not a member* of *the target group,* the [another] *first* terminal *does not monitor the group message*.

[6. The terminal of claim 4, wherein the at least one processor is further configured to control the transceiver to receive resource information for the discovery request message and the discovery response message from a base station.]

7. A method [of communication for] *performed by* a *first* terminal *in a wireless communication system*, the method comprising:

*receiving, from a base station, radio resource information for transmitting an alert message;* transmitting[a discovery request], *to a second terminal, the alert* message *based on the radio resource information, the alert message* including [first] *a group identifier (ID) for a target group and* information [to another terminal] *indicating a time associated with a group message transmission*; and

[receiving]*transmitting* a [discovery response] *group* message[including information corresponding to the first information from at least one other],

*wherein the group message is received by the second* terminal which is [configured with second information that is] a [same as the first information] *member of the target group indicated by the group ID in the alert message*.

[8. The method of claim 7, wherein the discovery request message further includes user identification information of the terminal.]

[9. The method of claim 7, further comprising:

receiving resource information for the discovery request message and the discovery response message from a base station.]

10. A *first* terminal, comprising:

a transceiver; and at least one processor configured to control the transceiver to:

*receive, from a base station, radio resource information for transmitting an alert message,* transmit[a discovery request], *to a second terminal, the alert* message *based on the radio resource information, the alert message* including [first] *a group identifier (ID) for a target group and* information [to another terminal] *indicating a time associated with a group message transmission*, and

[monitor] *transmit* a [discovery response] *group* message[including wherein the second discovery message is transmitted from the other terminal if information corresponding to the first information from at least one other terminal which is configured with second information that is a same as the first information],

*wherein the group message is received by the second terminal which is a member of the target group indicated by the group ID in the alert message.*

[11. The terminal of claim 10, wherein the discovery request message further includes user identification information of the terminal.]

[12. The terminal of claim 10, wherein the at least one processor is further configured to control the transceiver to receive resource information for the discovery request message and the discovery response message from a base station.]

*13. The method of claim 1, wherein the group message includes a group ID and group data.*

*14. A method performed by a first terminal, the method comprising:*

*receiving, from a base station, radio resource information for receiving a discovery request message and transmitting a discovery response message;*

*receiving, from a second terminal, the discovery request message including first identification information on a requested service based on the radio resource information;*

*identifying that the first identification information in the discovery request message corresponds to second identification information configured for the first terminal; and*

*in response to identifying that the first identification information corresponds to the second identification information, transmitting, to the second terminal, the discovery response message including additional information based on the radio resource information.*

*15. The method of claim 14, wherein the discovery request message further includes identification information of the second terminal.*

*16. The method of claim 14, further comprising:*

*receiving, from the second terminal, a discovery message including the additional information.*

*17. A first terminal in a wireless communication system, the first terminal comprising:*

*a transceiver; and*

*at least one processor coupled with the transceiver and configured to:*

*control the transceiver to receive radio resource information for receiving a discovery request message and transmitting a discovery response message, from a base station,*

*control the transceiver to receive the discovery request message including first identification information on a requested service from a second terminal based on the radio resource information,*

*identify that the first identification information in the discovery request message corresponds to second identification information configured for the first terminal, and*

*control the transceiver to transmit the discovery response message to the second terminal based on the radio resource information, in response to identifying that the first identification information corresponds to the second identification information.*

*18. The terminal of claim 17, wherein the discovery request message further includes identification information of the second terminal.*

*19. A method performed by a first terminal, the method comprising:*

*receiving, from a base station, radio resource information for transmitting a discovery request message and receiving a discovery response message;*

*transmitting, to a second terminal, the discovery request message including first identification information on a requested service based on the radio resource information; and*

*receiving, from the second terminal, the discovery response message including additional information based on the radio resource information.*

*20. The method of claim 19, wherein the discovery request message further includes identification information of the first terminal.*

*21. A first terminal in a wireless communication system, the first terminal comprising:*

*a transceiver; and*

*at least one processor coupled with the transceiver and configured to:*

*control the transceiver to receive radio resource information for transmitting a discovery request message and receiving a discovery response message, from a base station,*

*control the transceiver to transmit the discovery request message including first identification information on a requested service to a second terminal based on the radio resource information, and*

*control the transceiver to receiving the discovery response message from the second terminal based on the radio resource information.*

*22. The terminal of claim 21, wherein the discovery request message further includes identification information of the first terminal.*

* * * * *